United States Patent
Wada

(10) Patent No.: US 6,445,811 B1
(45) Date of Patent: Sep. 3, 2002

(54) FINGERPRINT IMAGE PROCESSING DEVICE AND FINGERPRINT IMAGE PROCESSING METHOD

(75) Inventor: Takuya Wada, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/265,110

(22) Filed: Mar. 9, 1999

(30) Foreign Application Priority Data

Mar. 11, 1998 (JP) .......................................... 10-059462

(51) Int. Cl.$^7$ ................................................. G06K 9/00

(52) U.S. Cl. ........................................ 382/125; 382/124

(58) Field of Search .................................. 382/114, 115, 382/116, 118, 119, 120, 123, 124, 126, 125; 356/237.2, 237, 445

(56) References Cited

U.S. PATENT DOCUMENTS

| | | | | |
|---|---|---|---|---|
| 4,219,737 A | * | 8/1980 | Gagnon et al. | 250/570 |
| 4,220,967 A | * | 9/1980 | Ichida et al. | 348/699 |
| 4,863,268 A | * | 9/1989 | Clarke et al. | 356/237 |
| 5,054,090 A | * | 10/1991 | Knight et al. | 382/127 |
| 5,812,252 A | * | 9/1998 | Bowker et al. | 356/71 |
| 6,175,640 B1 | * | 1/2001 | Wada | 382/124 |

* cited by examiner

*Primary Examiner*—Andrew W. Johns
*Assistant Examiner*—Seyed Azarian
(74) *Attorney, Agent, or Firm*—Frommer Lawrence & Haug LLP; William S. Frommer; Bruno Polito

(57) ABSTRACT

A fingerprint image processing device and fingerprint image processing method used for instance in fingerprint check devices which reliably processes the fingerprint image by detecting the ripple DM of the brightness level of the fingerprint image and starts the processing of a fingerprint image based on the ripple DM.

12 Claims, 7 Drawing Sheets

F I G. 4
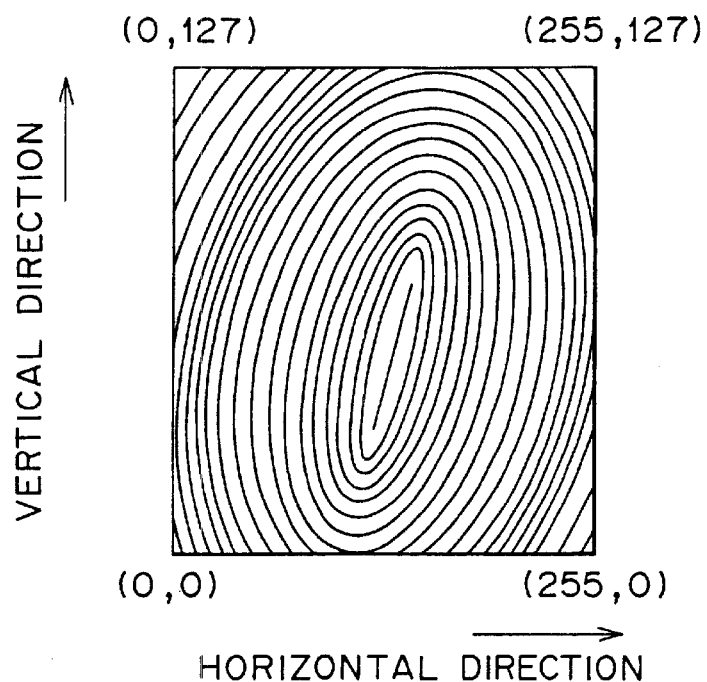
F I G. 6
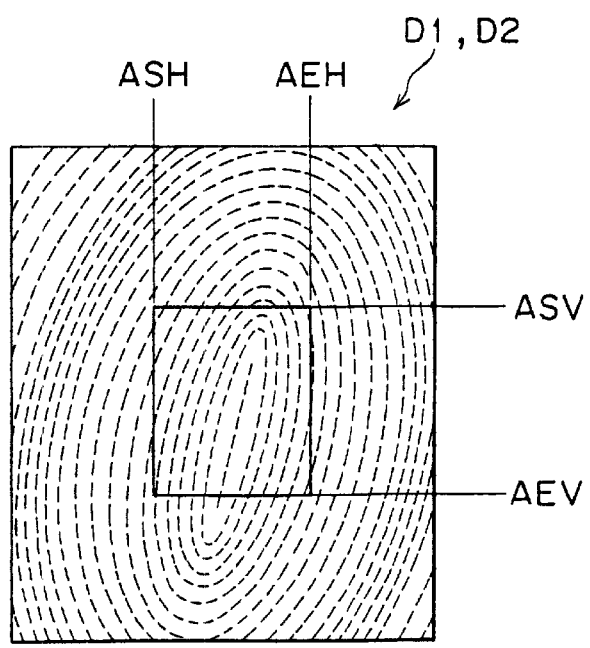

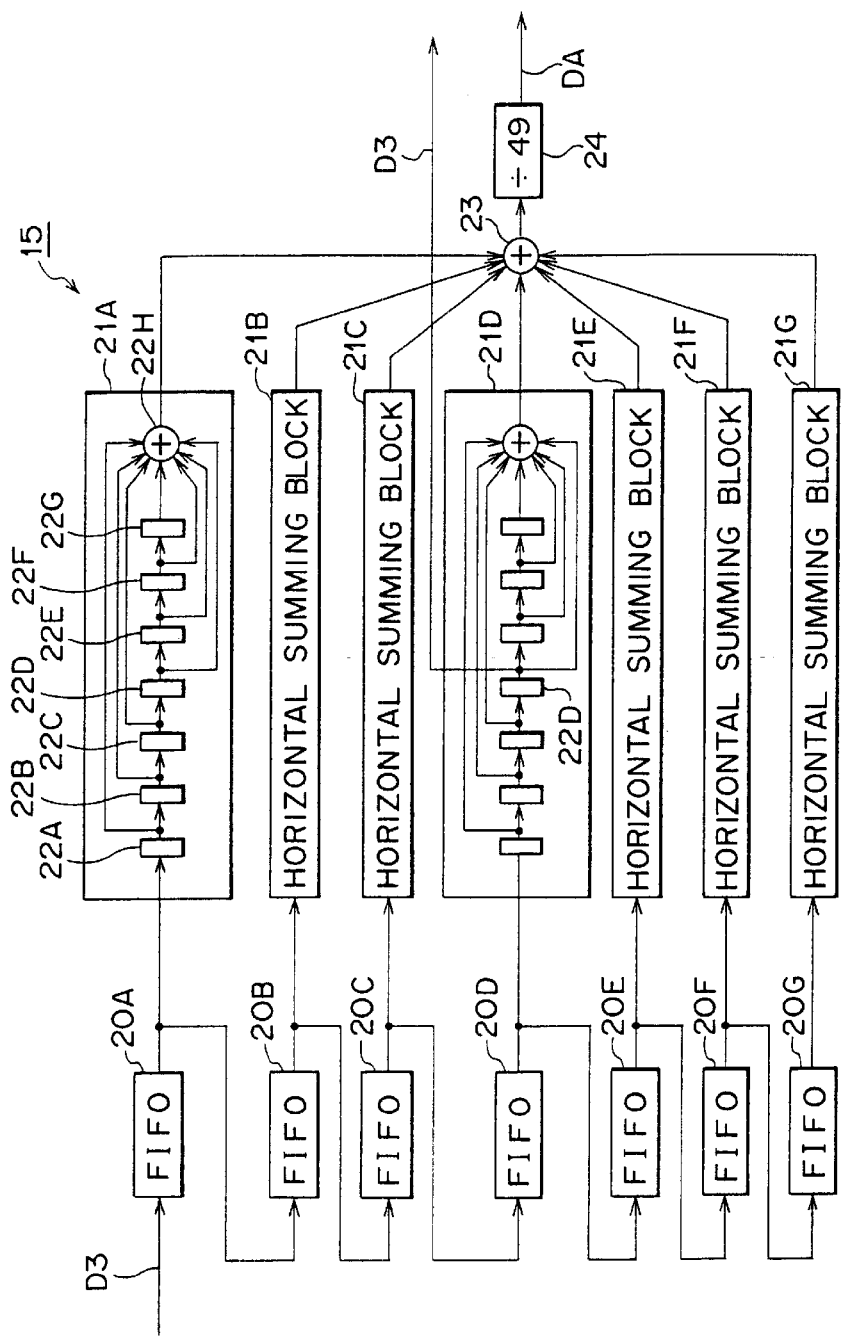

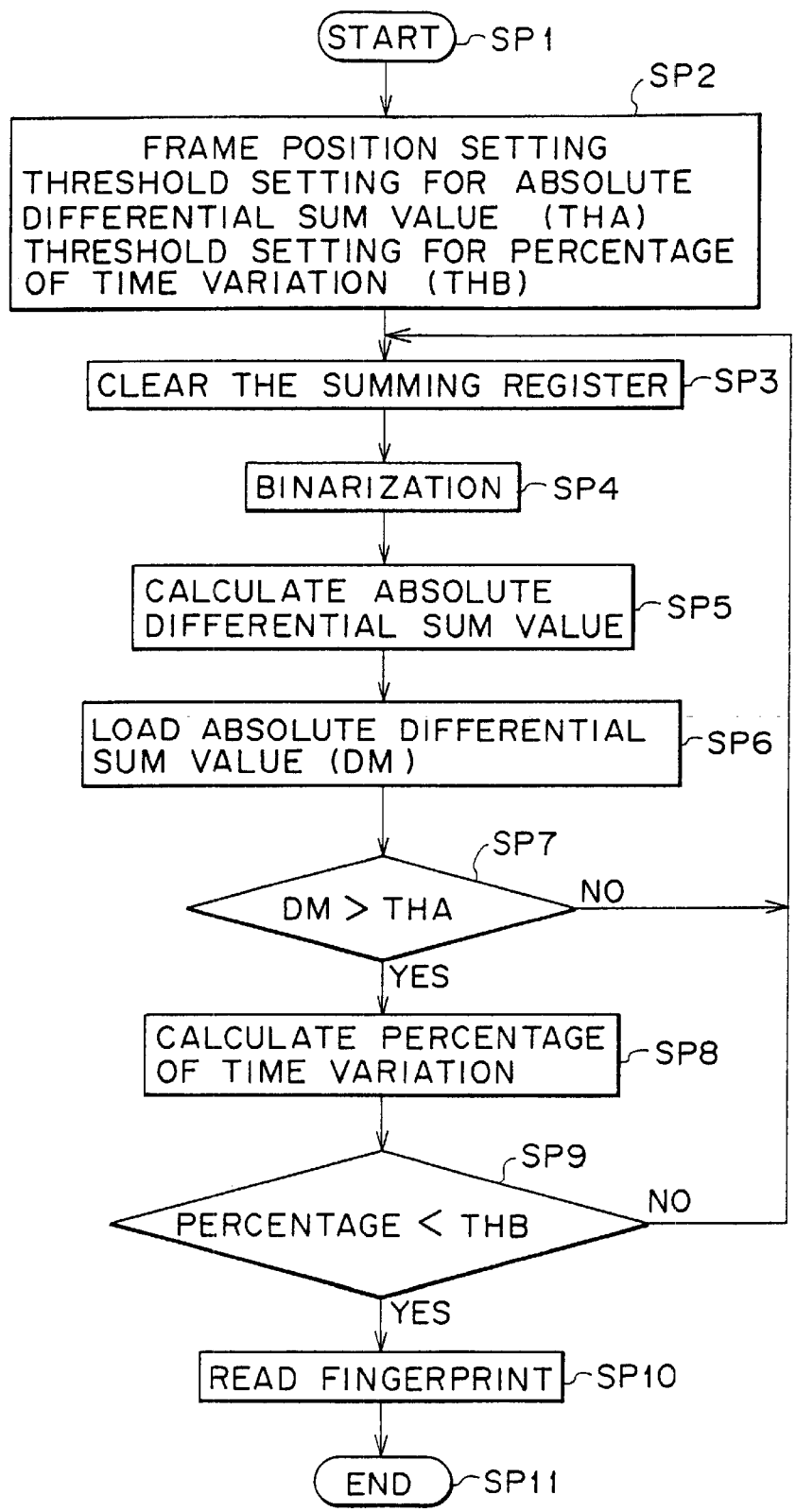

FINGERPRINT IMAGE PROCESSING DEVICE AND FINGERPRINT IMAGE PROCESSING METHOD

BACKGROUND OF THE INVENTION

1. Field of the Invention

The present invention relates to a fingerprint image processing device and fingerprint image processing method applicable for instance in a fingerprint check device.

2. Description of Related Art

In a fingerprint check device of the conventional art, a fingerprint image was captured from the placing of the fingertip at the specified placement position and for instance the entry or exit from a room was allowed by a check of that fingerprint image.

In this kind of fingerprint check device, a technique was proposed in which placement of a finger was detected and processing started by monitoring changes in the sequentially input image data. This kind of device permitted use of a simple overall structure since there was no need to provide a separate device to detect placement of fingers.

However, when commencing image processing based merely on changes in image data, processing also commenced just by placing an object other than the finger at the placement position of the fingerprint check device. Another problem was that in brightly lit environments, processing was started just by a shadow passing over the finger placement position. Due to these reasons, the conventional art had the problem that reliable capturing of fingerprint images was difficult when processing started merely based on changes in image data.

SUMMARY OF THE INVENTION

In view of the above problems with the conventional art it is therefore an object of this invention to provide a fingerprint image processing device and fingerprint image processing method capable of starting processing of the fingerprint image only when the finger is correctly placed and the fingerprint image can be reliably captured.

In order to resolve the above mentioned problems, this invention detects the degree of the ripple showing changes in the spatial brightness level of the fingerprint image, and perform reliable image processing by starting the processing of the fingerprint image based on the degree of ripple.

In other words, this invention detects the degree of ripple indicating the spatial brightness level changes of the fingerprint image from the fingerprint image input by the image input technique for capturing the image of the fingerprint and then starts processing of the fingerprint image when the results of ripple detection exceed a specified threshold value.

When the finger is placed on the finger placement position, a fingerprint image is acquired having a brightness level corresponding to the pattern of the fingerprints. The brightness level of the fingerprint image is a pattern alternately changing between a high brightness portion and a low brightness portion within a short period. The change in the spatial brightness level is referred to a ripple in these specifications. Accordingly, the fingerprint image has a ripple when the finger is placed in the finger placement position. However, when an object other than a finger but having the same image projection area of the finger is placed on the finger placement position or when a shadow falls across the finger placement position in brightly lit environments, a change in the brightness level is then generated equivalent to that level when a finger is placed on the finger placement position, however this image will not contain the ripple of the brightness level characterized by a fingerprint image. Consequently, to acquire and process an actual fingerprint image, a ripple is detected at a degree showing a change in the spatial brightness level of the image acquired as the fingerprint image, when the detection data from this ripple exceeds a specified threshold value, the processing of the fingerprint image starts in order to allow reliably acquiring the fingerprint image when the finger is actually placed in the specified finger placement position.

BRIEF DESCRIPTION OF THE DRAWINGS

FIG. 4 is a diagrammatic sketch showing the fingerprint image input by means of the fingerprint data entry section of FIG. 3.

FIG. 5 is a block diagram showing the equalizer circuit of the fingerprint check device of FIG. 2.

FIG. 6 is a diagrammatic sketch showing the ripple detection range by means of the ripple detector circuit of FIG. 1.

FIG. 8 is a flowchart showing the processing sequence of the system controller of the fingerprint check device of the third embodiment.

DETAILED DESCRIPTION OF THE PREFERRED EMBODIMENTS

The embodiment of this invention is described hereafter while referring to the accompanying drawings.

First Embodiment

Figure 2:
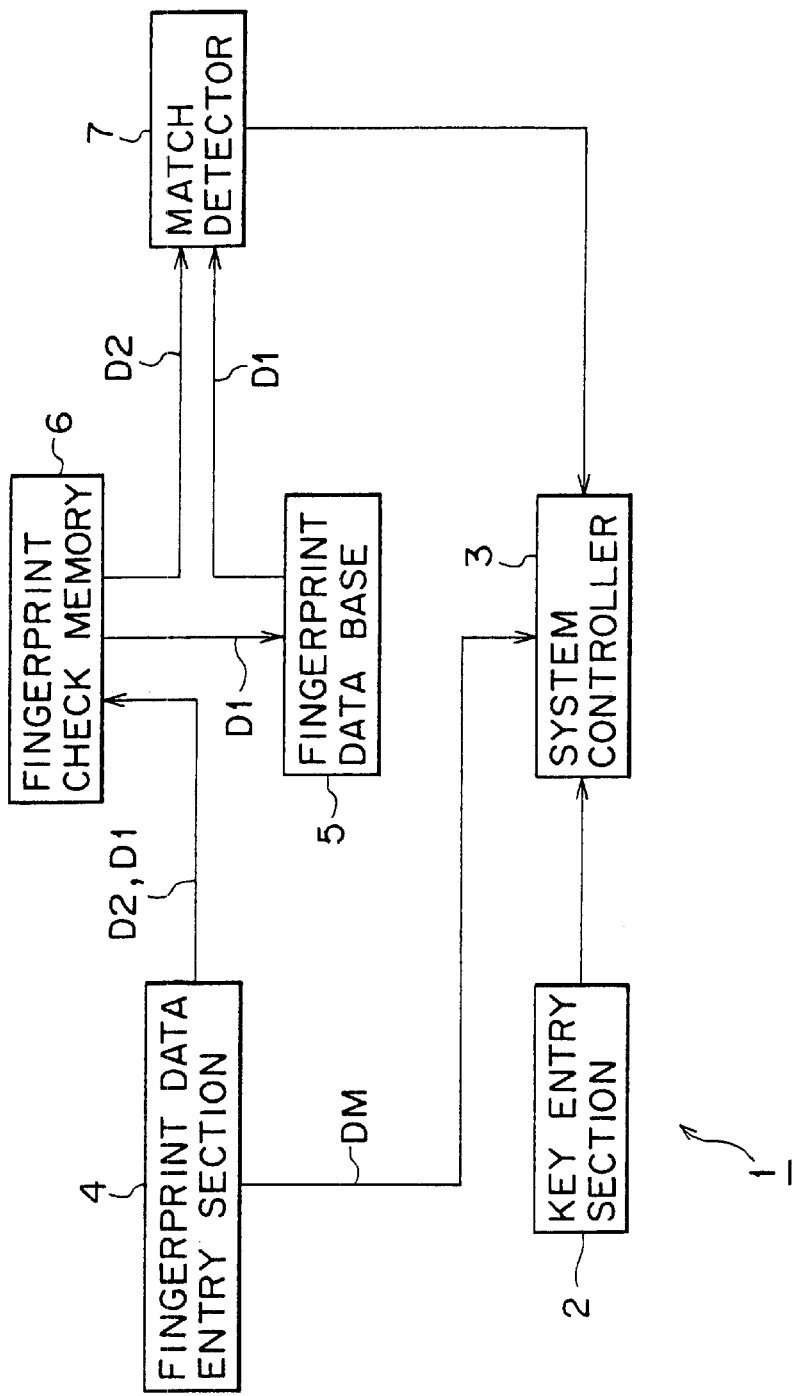
FIG. 2 is a block diagram showing the fingerprint check device relating to the embodiment of this invention.

FIG. 2 is a block diagram showing the fingerprint check device relating to the embodiment of this invention. In a fingerprint check device 1, the overall operation is controlled by a system controller 3 in response to user operation input by way of a key entry section 2.

More specifically, when the user selects the registration process in the fingerprint check device 1, a fingerprint data D1 input from a fingerprint data entry section 4 is input to the fingerprint check memory 6. This fingerprint data D1 is registered and a fingerprint data base 5 created. When the user enters a request for a fingerprint check (match), the fingerprint data D2 to be checked is input to the fingerprint check memory 6 by way of the fingerprint data entry section 4. Further, the fingerprint data D2 taken into the fingerprint check memory 6, and the fingerprint data D1 registered in the fingerprint data base 5 are input to the match detector 7. A collation rate to a degree indicating a fingerprint match is detected in this match detector 7. Based on a check of the collation (match) rate, the system controller 3 of the fingerprint check device 1 then outputs the fingerprint check results to an external device.

The fingerprint data D1 is thus registered and when collating the fingerprints, the fingerprint check device 1 detects the ripple brightness level of the fingerprint image input from the fingerprint data entry section 4 and outputs a data DM for the ripple detection result. Further, the system controller 3 detects that the finger is stably and securely placed at the specified finger placement position by means of the check from the data DM ripple detection result, and the fingerprint data D1 is then input to the fingerprint check memory 6 that was awaiting this information and processing then performed. The fingerprint check device 1 in this way improves the fingerprint collation (check) accuracy.

Figure 3:
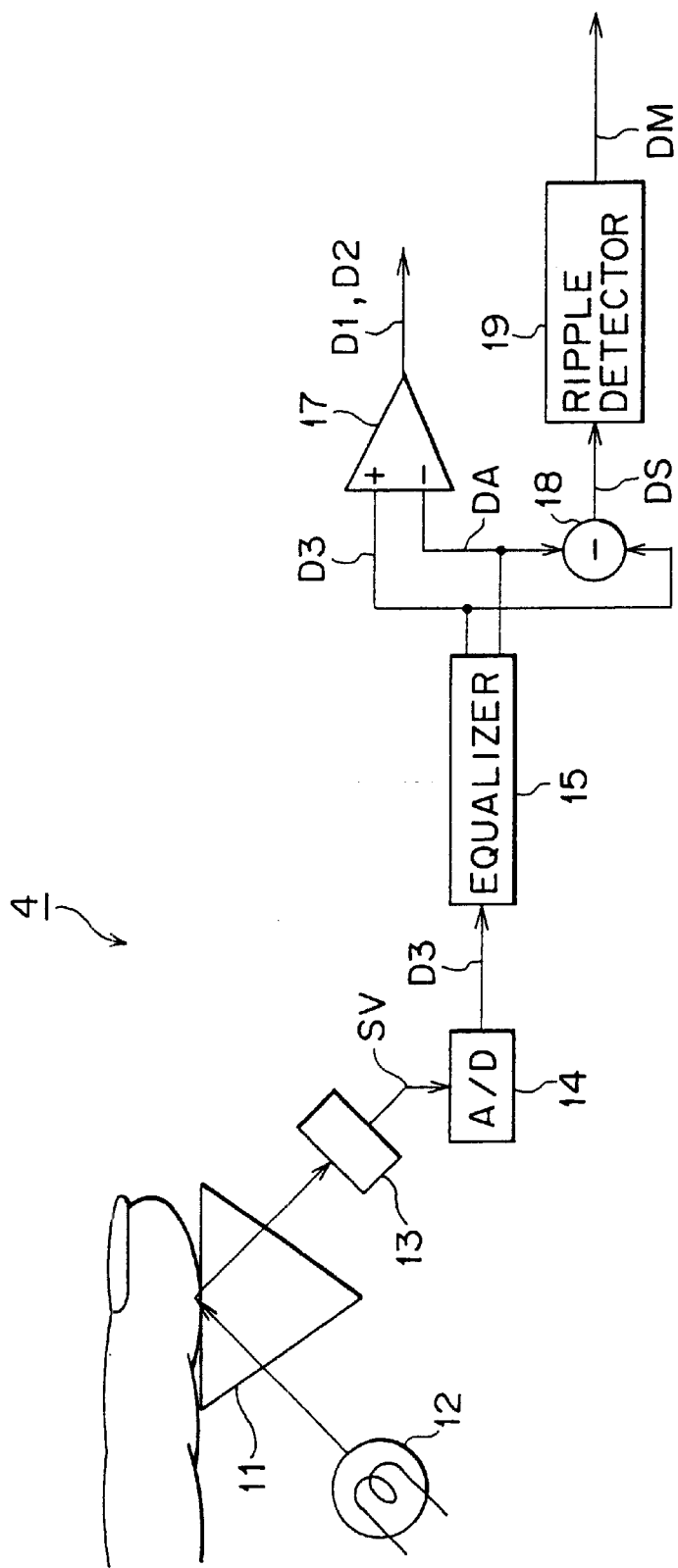
FIG. 3 is a block diagram showing the fingerprint data entry section for the fingerprint check device of FIG. 2.

A block diagram of the fingerprint data entry section 4 is shown in FIG. 3. This fingerprint data entry section 4 performs image acquisition of the fingerprint from the user's finger utilizing the specified optical system and generates the fingerprint data D1, D2 from the resulting image data.

The optical system utilized here is comprised of an isosceles triangle prism 11 installed so the bottom of the prism samples the fingerprint of the finger, a lamp source 12 to light the bottom of the isosceles triangle prism 11 from an oblique surface and a CCD camera 13 to capture an image of the light remaining on the oblique surface from the illuminating light of lamp source 12 reflected from the bottom surface. The lamp source 12 is comprised of a light emitting diode array, etc.

In sections on the bottom of the isosceles triangle prism 11 in this optical system that do not make contact with the skin, the illuminating light beamed from the lamp source 12 is totally reflected from the bottom surface and guided into the CCD camera 13. However, on the sections on the bottom of the isosceles triangle prism 11 that do make contact with the skin, the illuminating light on the bottom surface is irregularly reflected, reducing the illuminating light entering the CCD camera 13. As a result, this optical system takes an image from the CCD camera 13 whose light and dark regions correspond to the pattern of the fingerprint and outputs an SV format video signal.

An analog/digital converter (A/D) 14 performs analog digital conversion of the video signal SV. As shown in FIG. 4, 256 samplings and 128 samplings are taken respectively in the horizontal and vertical directions of the fingerprint image and the result output as 8 bit video data D3.

An equalizer circuit 15 equalizes the sequentially input video data D3 by a specified sampling count to detect an average (mean) value data DA by means of localized value for the video data D3 and then outputs this average (mean) value along with the corresponding video data D3.

A comparator circuit 17 compares the average data DA with the video data D3 output from the equalizer circuit 15 and by outputting the results of this comparison, binarizes the video data D3 based on the localized movement average and outputs fingerprint data D1 or D2. The comparator circuit 17 thus outputs a binarized fingerprint image consisting of 256 horizontal samplings and 128 vertical samplings.

A subtracter circuit 18 subtracts the average data DA from the video data output from the equalizer circuit 15 and outputs a differential data DS. A ripple detector 19 changes the differential data DS into an absolute value before making a total within a specified range and then outputs the total as the ripple detection result data DM.

FIG. 5 is a block diagram showing the equalizer circuit of the fingerprint check device of FIG. 2. In this equalizer circuit 15, the video data D3 is input to the input terminals of a serial circuit formed by seven FIFO20A through FIFO20G connected in series. Here, each of the FIFO20A–20G is configured of 256 bytes equivalent to the horizontal sampling count for the fingerprint image, and the video data D3 input in sequential cluster scanning procedure is then output with a delay. By this arrangement, the FIFO20A–20G are thus configured to simultaneously output in parallel, a vertically linked seven pixel portion of the video data D3.

The horizontal summing blocks 21A through 21G input the video data D3 into a serial circuit by means of the respective D flipflops 22A–22G, and calculate the total value from the vertically linked seven pixel portion of the video data D3.

In other words, the horizontal summing block 21D in the center of the horizontal summing blocks 21A through 21G is configured the same as the other summing blocks except for the provision of a tap output, and inputs the video data D3 into the seven stages of D flipflops 22A–22G connected in serial. Further, the horizontal summing blocks 21A–21G add the output data from the seven stages of D flipflops 22A–22G in the adder circuit 22H and in this way, the brightness level total data value per the vertically linked seven pixel portion of the video data D3 is output.

In addition, the center horizontal summing block 21D obtains a tapped output from the D flipflop 22D which issues output data from the center of the D flipflops 22A–22G, and this output data is next sent to the comparator circuit 17 and the subtracter circuit 18 (FIG. 3).

The adder circuit 23 further totals the accumulated data output from these horizontal summing blocks 21A through 21G and thus the total for the range of 7×7 pixels centering on the accumulated video data D3 output from the center horizontal summing block 21D is then output.

A divider circuit (divides by 49) 24 divides the total value output from the adder circuit 23 by the number of pixels (7×7=49) and thus outputs an average value data DA. By this process, the equalizer circuit 15, outputs in raster scan sequence, an average value data DA which is a localized movement average in a range of 7×7 pixels centering on the video data D3 output from the center horizontal summing block 21D.

Figure 1:
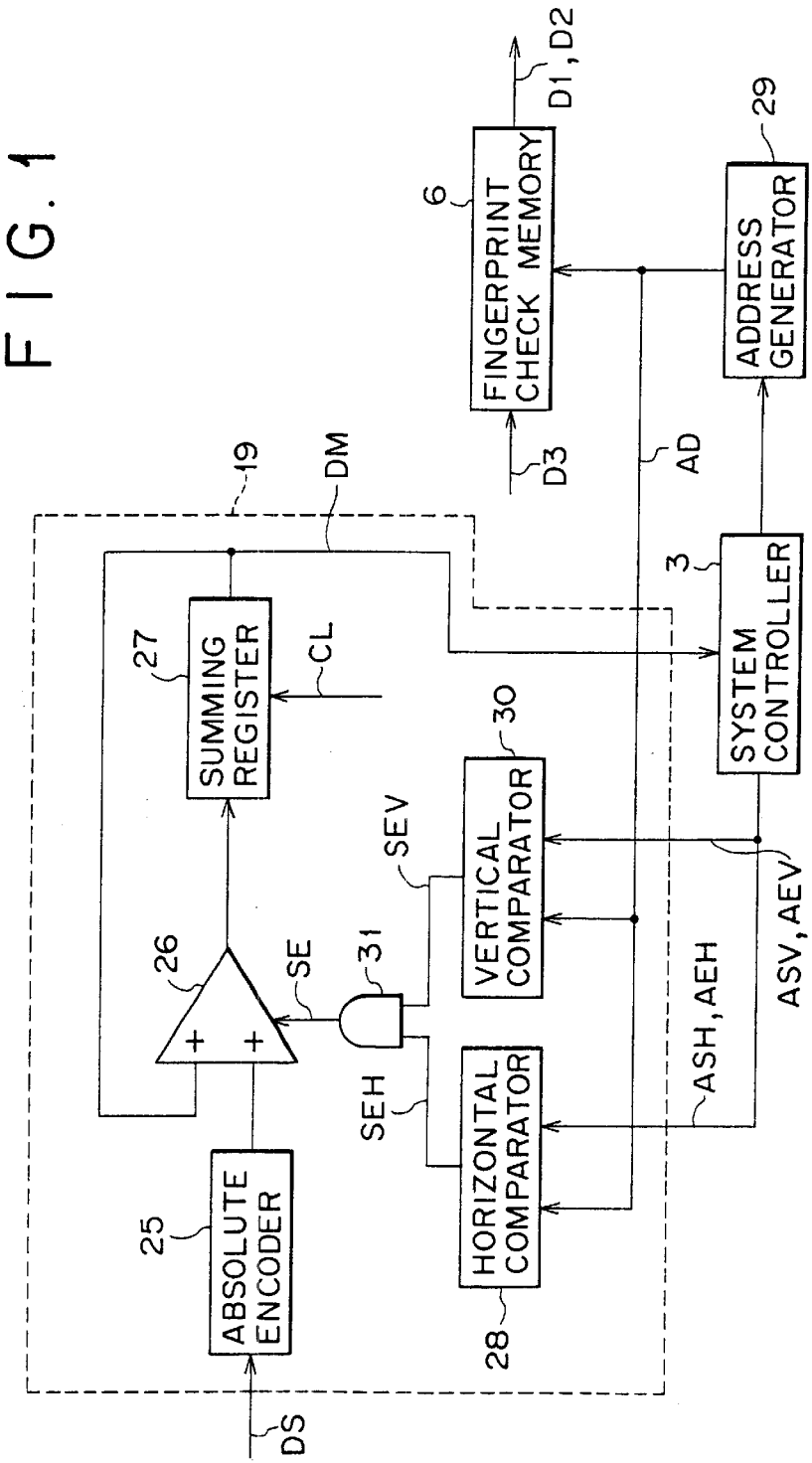
FIG. 1 is a block diagram showing the ripple detector circuit for the fingerprint check device relating to the embodiment of this invention.

FIG. 1 is a block view of the ripple detector circuit 19 and peripheral circuits. This ripple detector circuit 19 totals the absolute value of the differential data DS within the specified range of the fingerprint image and outputs the ripple detection result data DM.

In the ripple detector circuit 19, the absolute encoder circuit 25 changes the sequentially input differential data DS into absolute values and outputs this absolute value data.

The adder circuit 26 adds the data output from the absolute encoder circuit 25 to the accumulated data held in the summing register 27 and outputs the result, and the summing register 27 holds the output data of the adder circuit 26. The adder circuit 26 and the summing register 27 perform these actions in timing synchronized with the video data D3 and therefore comprise a cumulative adder for adding the total absolute values of the differential data DS.

The contents held by the summing register 27 at this time are cleared by application of a clear signal CL output by timing corresponding to the vertical synchronizing signal of the video signal SV (see FIG. 3) and operation of the adder circuit 26 is triggered by a specified control signal SE. Thus in the cumulative adder circuit comprised of the adder circuit 26 and the summing register 27, cumulative adding of the absolute values for the differential data DS is performed for one fingerprint image set in the specified range and these cumulative adding results are sent to the system controller 3 as the rippled detection result data DM.

Hereafter, the operation for generating the control signal SE is described. In the ripple detection circuit 19, a horizontal comparator 28 receives the settings for the horizontal start address ASH and the end address AEH by means of the system controller 3, and by comparing the address data AD of the fingerprint check memory 6 output from an address generator 29 with this start address ASH and the end address AEH, a horizontal control signal SEH is output as a logic level pulse rise during the time that the value of the address data AD is within the values from the start address ASH to the end address AEH.

In the same way, the vertical comparator 30 receives the vertical start address ASV and end address AEV settings from the system controller 3 and by comparing the start address ASV and end address AEV with the address data AD from the fingerprint check memory 6 output by the address generator 29; outputs a vertical control signal SEV as a logic level pulse rise during the time that the value of the address data AD is within the values from the start address ASV to the end address AEV.

An AND circuit 31 logically sums the horizontal control signal SEH and the vertical control signal SEV to generate a logically summed signal and as shown in FIG. 6 to generate a control signal SE at the rise in the signal level in the area with the rectangular shape determined by the horizontal start address ASH and end address AEH, and the vertical start address ASV and end address AEV. Thus, the ripple detector 19 is able to detect a ripple in the brightness level of the video signal SV in this rectangular area.

When triggered in response to user operation, the system controller 3 respectively sets the horizontal start address ASH and end address AEH, and the vertical start address ASV and end address AEV into the horizontal comparator 28 and the vertical comparator 29. This process sets the range in the horizontal comparator 28 and the vertical comparator 29 for detecting the ripple of the brightness level.

Further, the system controller 3 also synchronizes with the vertical synchronizing signal of the video signal SV and by issuing a clear signal CL directly or by way of the address generator 29, resets the contents of the summing register 27 in a one frame synchronization with the summing register 27.

The system controller 3 takes in the ripple detection result data DM in units of one frame from the summing register 27 and determines whether or not the value of this data DM has exceeded a specified threshold value. At this point, when the specified threshold value has been exceeded, the system controller 3 decides that the finger is correctly placed on the finger placement position and that the fingerprint data can be sampled, and the address generator 29 is then commanded to function so that the fingerprint data D1, D2 are input into the fingerprint check memory 6. In this way, the system controller 3 registers into the fingerprint data base, the fingerprint data input into the fingerprint check memory 6 and checks the fingerprints.

Thus, when configured as described above, when a finger is placed at the finger placement position which is the bottom of an isosceles triangle prism, in the fingerprint check device 1, (FIG. 2 and FIG. 3) the fingerprint image detected at the position the finger is placed is taken into the fingerprint check memory 6. This fingerprint image is then registered into the fingerprint data base 5 or fingerprint collation (checking) performed.

Restated, in the fingerprint check device 1, an illuminating light beamed from the lamp source 12 is reflected from the bottom of the isosceles triangle prism 11 and captured by the CCD camera. This captured image data which is the video signal SV is converted into the video data D3 by the analog/digital converter circuit 14. Further, this video data D3, is detected as a localized movement average value in units of 7×7 pixel range in the equalizer circuit 15. Binarization is then performed based on this equalized value in the comparator 17 to convert to binarized fingerprint data D1 or D2. This fingerprint data D1 or D2 is then registered into the fingerprint check memory 6 so that the fingerprint image is taken into the fingerprint check memory 6.

While taking in of the fingerprint data D1, D2 into this fingerprint check memory 6, the differential data DS is detected from the localized movement average value of the video data D3 in the subtracter circuit 18. Further, the absolute value of this differential data DS is detected in the absolute encoder 25 (FIG. 1) of the ripple detector circuit 19, and cumulative adding of this value then performed in the adder circuit 26 and the summing register 27. By this process, the degree of the ripple of the brightness level is detected based on the localized movement average value of this video data D3. The degree of ripple is the amount of variation occurring in response to both the amplitude of variations in the brightness level and the frequency of the variations in the brightness level.

The adder circuit 26 is triggered by this control signal SE based on the horizontal start address ASH and end address AEH, and the vertical start address ASV and end address AEV respectively set into the horizontal comparator 28 and the vertical comparator 30; and the degree of ripple is detected in the region having the rectangular shape defined by these addresses ASH, AEH, ASV and AEV for the video data D3 at this time.

In the ripple of the brightness level based on the localized movement average value which was cumulatively added and detected as described, when a brightness level ripple occurs with a short period as in the case of fingerprint, a large value is obtained as the degree or extent of the ripple. Conversely, when an object other than a finger is placed on the finger placement position, only a small value is obtained showing the degree or extent of the ripple. Further, even if the shadow of an object falls across the finger placement position while in a bright environment, only a small value is obtained as the degree or extent of the ripple.

Thus, when the ripple of the brightness level based on the average value of the localized movement average value which was cumulatively added and detected as described, exceeds the specified value in this video data D3, the system controller 3 determines that a finger is correctly placed on the finger placement position and that fingerprint data can be reliably sampled; and the binarized fingerprint data D1 or D2 is then input into the fingerprint check memory 6. The fingerprint image is therefore registered and or collated (checked) by placing the finger reliably on the finger placement position in the fingerprint check device 1 and the accuracy of the fingerprint check process therefore further improved.

In the configuration as described above, by detecting the ripple of the brightness level based on the localized movement average value and by inputting the fingerprint image based on this brightness level ripple, the inadvertent or mistaken capturing of an image can be prevented in cases where an object other than a finger was placed on the finger placement position or when the shadow of an object falls across the finger placement position and therefore the process of capturing and processing an actual fingerprint image can be reliably performed.

Second Embodiment

Figure 7:
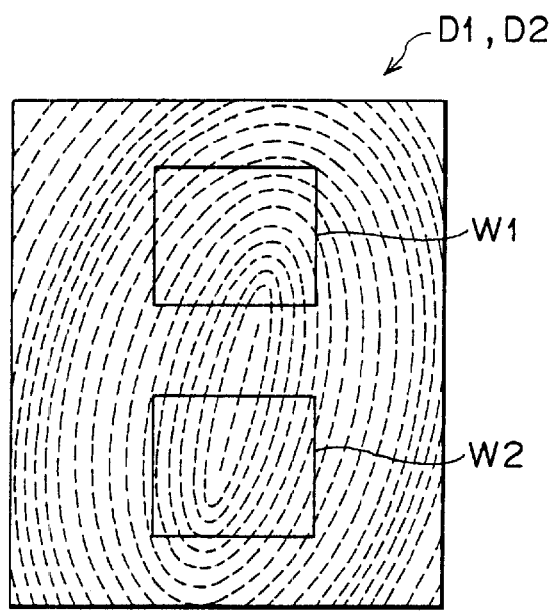
FIG. 7 is a diagrammatic sketch showing the ripple detection range for the fingerprint check device of the second embodiment.

FIG. 7 is a diagrammatic sketch showing the region for cumulative adding of the differential data DS value in the fingerprint check device of the second embodiment of this invention. This embodiment has two ripple detection circuits 19 and by setting a horizontal start address, end address, vertical start address, and end address respectively in each of circuit 19, two frames W1 and W2 can be set inside the fingerprint image. These two frames prevent the start of processing of the fingerprint image if the finger is not correctly placed on the finger placement position.

By this arrangement in the fingerprint check device of the second embodiment, the ripple for each brightness level is detected in the frames W1 and W2. Here, the frames W1 and W2 are suitably positioned versus the finger placement position so that when for instance a portions of the fingertip is placed on the finger placement position, the fingerprint image cannot be captured from just one frame.

The system controller circuit, commands the input of the fingerprint image into the fingerprint check memory 6 when the respective ripple detection result data exceeds a specified value inside the frames W1 and W2.

In this fingerprint check device, consideration was given to cases when only a portion of the finger is laid on the finger placement device, in such cases obtaining a fingerprint image of sufficient size may sometimes not be possible to allow fingerprint registration and checking. However in this embodiment the ripple of a plurality of frames W1 and W2 are detected and when the respective ripple detection data in the frames W1 and W2 has exceeded as specified value, the input of fingerprint data can be stopped when input of a fingerprint image to the fingerprint check memory 6 has been commanded in the above event that only a portion of the finger was placed on the finger placement position. Thus the input of fingerprint data can be made even more reliable.

Third Embodiment

FIG. 8 is a flowchart showing the process flow of the system controller in the fingerprint check device of the third embodiment of this invention. This system controller implements the processing procedure and inputs the fingerprint image.

Generally, the ripple brightness detection level of the fingerprint image fluctuates greatly according to how dry the finger is. More specifically, the ripple tends to decrease when the finger is dry. The degree of the ripple also varies between individuals and also varies a great deal according to the season, even for the same person. Consequently, this embodiment allows the threshold to be set to a low value so that the fingerprint can be detected even when the ripple is small.

However, when the threshold is set to a low value in this way, the operation to commence input of the fingerprint image might sometimes begin while the finger is not sufficiently stationary if the processing of the fingerprints is set to start merely according to the size of the ripple as in the case of the first and second embodiments. Further, if the threshold value is set higher in order to prevent such kind of mistaken operation, then the possibility exists that processing of the fingerprint data might not start even if the finger is placed correctly.

Consequently, in the third embodiment, a small value is set in proportion to the threshold value THA used in judging the size of the ripple. This arrangement ensures that the ripple detection result data DM will be larger than the threshold value THA even if the finger placed on the finger placement position is dry.

Further, even when the ripple detection result data DM is a value larger than the threshold value THA, the input of the fingerprint data D1, D2 begins when time-dependent fluctuations in the ripple are concentrated within the specified value. Therefore, there is no input of the fingerprint image unless the finger is sufficiently stationary, and even when ripple in the fingerprint image is small, the processing of the fingerprint data D1, D2 can reliably commence.

In other words, the system controller shifts from step SP1 to step SP2, the start address and the end address are set respectively in the horizontal comparator 28, the vertical comparator 30. Thus, the frame constituting the detection range of the ripple is set. The system controller further sets the THA threshold value used in judging the ripple, and the THB threshold value used in judging the time-dependent variations, into the internal register.

The system controller next shifts the operation to step SP3, and issues a clear signal CL to clear the contents of the summing register 27.

The system controller next shifts the operation to step SP4, and starts sequential input of image data by way of the fingerprint data entry section 4, detects the localized movement average value by means of the equalizer circuit 15, and along with continuous sequential binarizing of the image data, commences calculation of the differential value data DS. Further, in step S5 the system controller next calculates the absolute value sum of the differential value data DS by means of the ripple detector circuit 19 and next in step S6, inputs these calculation results as ripple detection result data DM.

In step SP7, the system controller determines whether or not this ripple detection result data DM that was input is larger than the threshold value THA that was set in step SP2, and returns to step SP3 when data DM is not larger than the threshold value THA. The system controller thus sequentially detects the ripple detection result data DM per the continuous video data D3 when the processing procedure begins, and shifts to step SP8 when this ripple detection result data DM is larger than the threshold value THA.

Here, after the system controller divides the ripple detection result data DM detected in step SP6 by the immediately prior detected ripple detection data DM, a value 1 is subtracted and thus the time-dependent change in ripple is detected which is a proportionally time-dependent summed value held in the register 27.

In step SP9, the system controller determines whether or not the time-dependent change in ripple is smaller than the time-dependent threshold value THB set in step SP2 and returns to step SP3 if not smaller. In this case, the system controller obtained a negative result in step SP7 due to detecting some kind of fingerprint image without light and dark sections prior to placing of the finger on the finger placement position, so the processing procedure of steps SP3 SP4 SP5 SP6 SP7 SP3 is repeated and when a consecutive ripple is detected in response to a finger being placed in position, operation shifts from step SP8 to SP9 and a time-dependent change is determined to have occurred.

Thus when a finger is placed in a sufficiently stable manner, a positive result can then be obtained in step SP9. The system controller then shifts from step SP9 to step SP10, and after commanding input of the fingerprint image into the fingerprint check memory 6, shifts to step SP11 to quit the processing procedure.

By commencing the fingerprint image processing based on time-dependent changes in ripple as well as the size of the ripple according to the configuration shown in FIG. 8, the process for input of the fingerprint data can be raised to a still higher level of reliability compared to the first or to the second embodiment.

Fourth Embodiment

Figure 9:
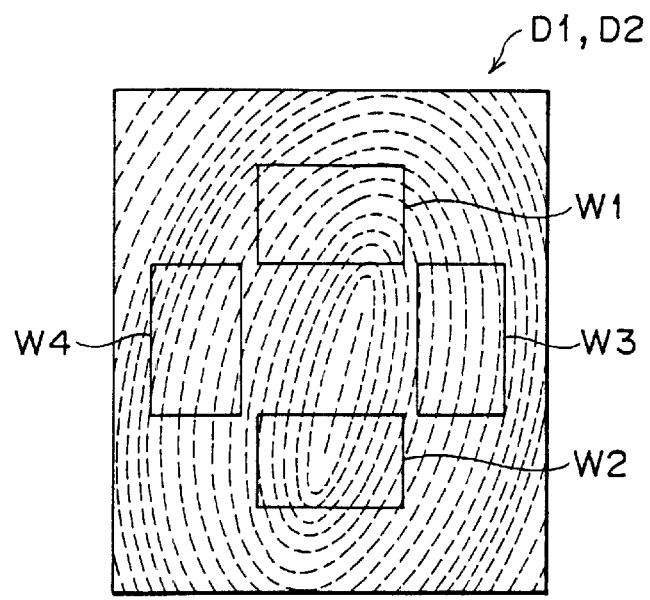
FIG. 9 is a diagrammatic sketch showing the detection range of the ripple in the fingerprint check device of another embodiment.

The starting of fingerprint data processing by means of two frames was described in the second embodiment described previously however as for example shown in FIG. 9, four frames may be installed in the horizontal and vertical directions for detecting the ripple. In such a case, a plurality of ripple detection circuits may be installed and used by switching the operation from one ripple detection circuit to another ripple detection circuit.

Further, in the third embodiment, a description of detecting the time-dependent ripple by subtracting a value 1 after dividing the ripple detection result data DM detected in step SP6 by the immediately prior detected ripple detection result data DM was described, however this invention is not limited to such a procedure, and is adaptable to a wide range of detection techniques such as detecting the time-dependent ripple by conversely dividing the immediately prior detected ripple detection result data DM by the ripple detection result data DM detected in step SP6.

An above embodiment also described detecting the ripple merely by absolute encoding of the differential value data and performing cumulative adding, however this invention is not limited to such a procedure, and is adaptable to a wide range of ripple detection techniques such as when detecting the ripple by squaring the differential value data and performing cumulative adding or further, when detecting the ripple by means of the peak hold by analog signal processing, etc.

Still further, an above embodiment described detecting the differential value data based on the localized movement average, however this invention is not limited to this method and may detect the differential value data based on the average value of one screen, and further may generate binarized data.

Yet further, an above embodiment described the input of fingerprint data into the fingerprint check memory 6 based on the ripple however this invention is not limited to this method and in a state where fingerprint data is input in a sequential, circulating manner to the fingerprint check memory, may simultaneously implement the detection of ripple and the input of fingerprint data into the fingerprint check memory 6, and start processing of this input fingerprint data based on the ripple.

Yet still further, an above embodiment described the register of fingerprint and check of fingerprints by means of the input of fingerprint data however this invention is not limited to this method and is widely adaptable to methods such as input of fingerprint images by means of for example a computer network terminal.

This invention therefore, configured as described above, detects the ripple brightness level for the fingerprint image and starts the processing of the fingerprint image based on this ripple thus allowing the acquisition of fingerprint images when the finger is stably and reliably placed on the placement position and therefore provide more definite and reliable processing of fingerprint images.

What is claimed is:

1. A fingerprint image processing device for processing fingerprint images of a finger placed on a specified placement position comprising:

an image input element to input the fingerprint image of the finger;

a ripple detection element to detect the degree of ripple showing the spatial fluctuations in brightness level of said fingerprint image input from said image input element and then output the ripple detection results; and a control element to commence processing of said fingerprint image when said ripple detection results of said ripple detection element exceed a specified threshold value.

2. A fingerprint image processing device of claim 1, wherein said ripple detection element performs absolute encoding of the difference in signal level of the individual image data of said fingerprint image versus the specified reference level, sums the absolute encoded values to obtain a cumulatively summed value, and then outputs said cumulatively summed value as said ripple detection result.

3. A fingerprint image processing device of claim 1, wherein said control element commences processing of said fingerprint image when time-dependent fluctuations of said ripple detection results are concentrated within the specified value.

4. A fingerprint image processing device of claim 1, wherein said ripple detection element selectively detects said ripple from a specified processing area of said fingerprint image.

5. A fingerprint image processing device of claim 4, wherein ripple detection element has a plurality of processing areas and obtains said ripple detection results in each area; and said control element commences processing of said fingerprint image when any of said ripple detection results obtained from said plurality of processing areas exceed a specified value.

6. A fingerprint image processing device of claim 1, wherein processing of said fingerprint image is registration processing onto said fingerprint image memory element, or fingerprint collation processing of said fingerprint image.

7. A fingerprint image processing method for processing fingerprint images of a finger placed on a specified finger placement position comprising the steps of:

detecting the degree of ripple indicating the changes in the spatial brightness level of said fingerprint image input by said image input element from said fingerprint image of the finger; and commencing processing of the said fingerprint image when the detection results of said ripple exceed a specified threshold value.

8. A fingerprint image processing method of claim 7, which absolute encodes each difference in image data signal level of said fingerprint image versus a specified reference level, and totals this absolute encoded value to obtain a cumulative added value, and then outputs said cumulative added value as said ripple detection result.

9. A fingerprint image processing method of claim 7, which starts processing of said fingerprint image when time-dependent fluctuations in said ripple detection results are concentrated within the specified value.

10. A fingerprint image processing method of claim 7, which selectively detects said ripple from the specified processing area within said fingerprint image.

11. A fingerprint image processing method of claim 10 having a plurality of said processing areas and commencing processing of said fingerprint image when any of said ripple detection results obtained from said plurality of processing areas exceeds a specified threshold value.

12. A fingerprint image processing method of claim 7, registering said fingerprint image onto said storage element for said fingerprint image or performing fingerprint collation processing of said fingerprint image.

* * * * *